United States Patent [19]

Hintz

[11] 3,875,529

[45] Apr. 1, 1975

[54] ROTATABLE INTRA-CAVITY POLARIZER FOR GAS LASERS ($CO_2$ IN PARTICULAR)

[75] Inventor: Robert T. Hintz, China Lake, Calif.

[73] Assignee: The United States of America as represented by the Secretary of the Navy, Washington, D.C.

[22] Filed: Sept. 14, 1972

[21] Appl. No.: 289,199

[52] U.S. Cl. .......................................... 331/94.5 C
[51] Int. Cl. ............................................. H01s 3/08
[58] Field of Search .................... 350/147; 331/94.5

[56] References Cited
UNITED STATES PATENTS 3,062,100  11/1962  Ludewig et al. ................... 350/255
3,617,938  11/1971  Denes ................................ 350/147

Primary Examiner—William L. Sikes
Attorney, Agent, or Firm—R. S. Sciascia; Roy Miller; Gerald F. Baker

[57] ABSTRACT

A gas laser is equipped with a polarization adaptor which may be rotated through 360°. The polarization axis may be rotated to any desired orientation by manipulating an outer control ring magnetically coupled to an inner polarizer ring.

1 Claim, 3 Drawing Figures

ROTATABLE INTRA-CAVITY POLARIZER FOR GAS LASERS ($CO_2$ IN PARTICULAR)

BACKGROUND OF THE INVENTION

This invention relates to gas lasers and particularly to $CO_2$ lasers and specifically to a polarizer adaptor which allows rotation of the polarization axis by a magnetically coupled outer control ring. Control of polarization, if any, in lasers has been by means of brewster windows or external polarizers (brewster angle flats).

A. Brewster Windows

Generally in the past the most common approach to polarization of a laser beam has been by brewster window. Either salt or Gallium Arsenide flats are attached to the ends of the laser tube at the brewster angle. This polarizes the output, but polarization may only be changed by rotating the entire system, or the windows. Rotating the entire system is impractical because of the heat exchanger and power connections, and the rotation of the windows is impractical because the vacuum seal at the windows must be maintained. The use of brewster windows in the system also reduces the total available power to the system.

B. External Polarizers

Brewster angle flats have been utilized, for example, as external polarizers polarizing the beam by being at the brewster angle normal to the output beam. In this system, however, a sizeable portion of the beam is reflected and, hence lost for all practical purposes because the polarized output is less than 50 percent of the power input to the polarizer. In this case, also, there is an alignment problem associated with maintaining the brewster angle between incident beam and the polarizer.

Further, either system is considered impractical because of alignment problems and the greater reflected beam portion when the polarizer is rotated. Also there is the possibility of contamination of the flats by dust, dirt and so forth and the vibration of the system is objectionable.

According to the present invention the polarization of a laser beam may be accomplished simply and easy by manipulation of an outer control ring magnetically coupled to an inner ring polarizer.

DESCRIPTION AND OPERATION

Figure 1:
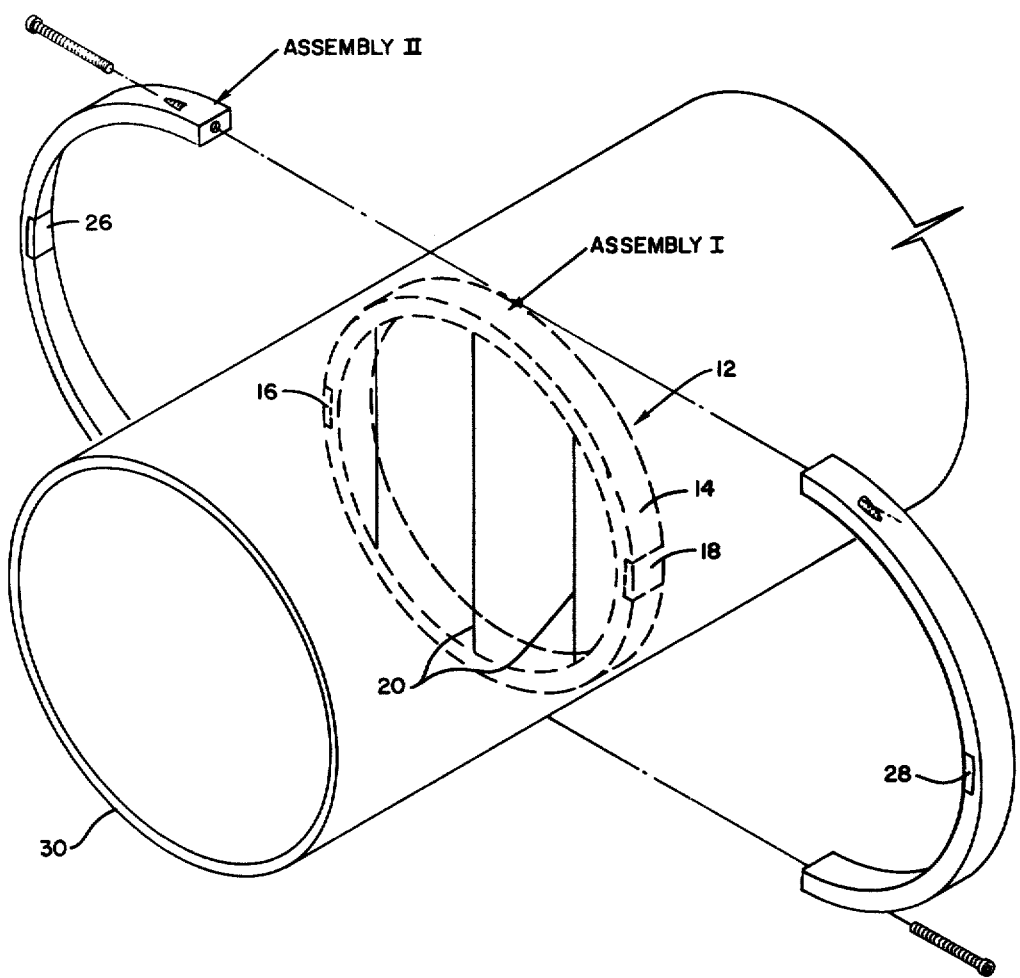
FIG. 1 is a diagrammatic perspective view of a device according to the invention.
Figure 2:
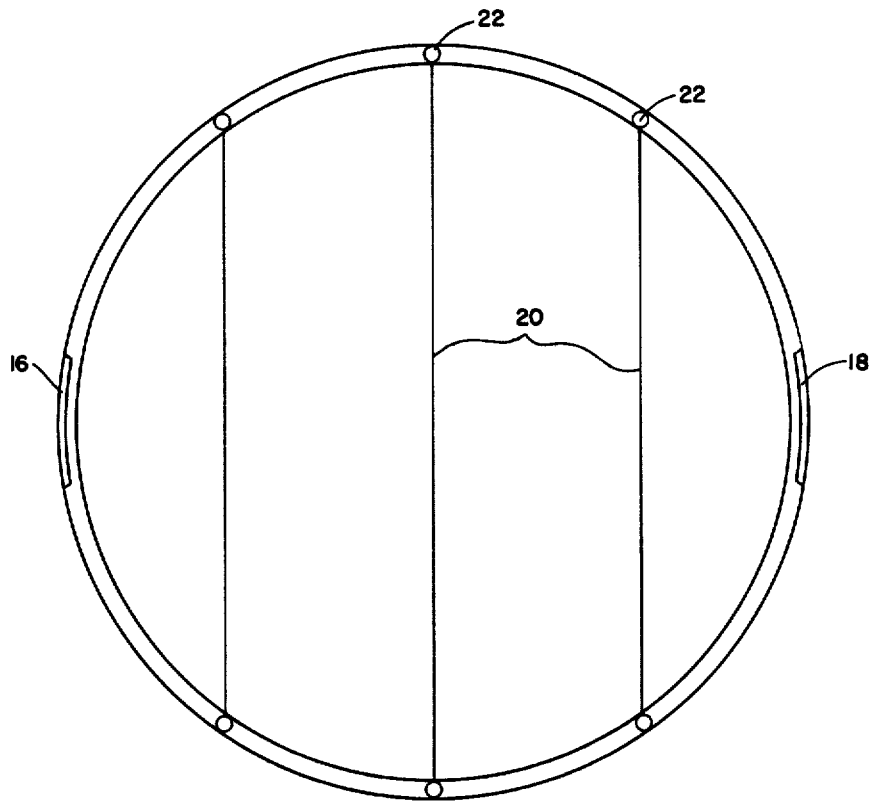
FIG. 2 is a plan view of a polarizer grid useable with the invention.

The polarizing grid 12 as shown in the FIG. 1 is constructed of a non-magnetic ring 14 of stainless steel or the like having magnetic inserts 16, 18 as shown in FIG. 2. These magnetic inserts 16, 18 may be of magnetic stainless steel, for example. The grid 12 is traversed by wires 20 which advantageously should have a diameter of approximately 1 mil (i.e. 0.001 inch) and may be made of steel, nickel titanium, stainless steel or a similar metal or alloy. The wires are spaced across the ring 14 and strung tightly on bolts 22.

The laser tube 30 may be modified if necessary to accomodate the ring 12 without vignetting out part of the available lasing cross section. A simple enlargement of the inner diameter at this point is all that is required.

If the system utilizes ring electrodes, the polarizer ring could be of similar dimensions and no tube modification would be required. Should it be desired to rotate the ring 12 continuously, the ring may be mounted on a teflon race (for example) or a bearing assembly to accomodate this motion.

Figure 3:
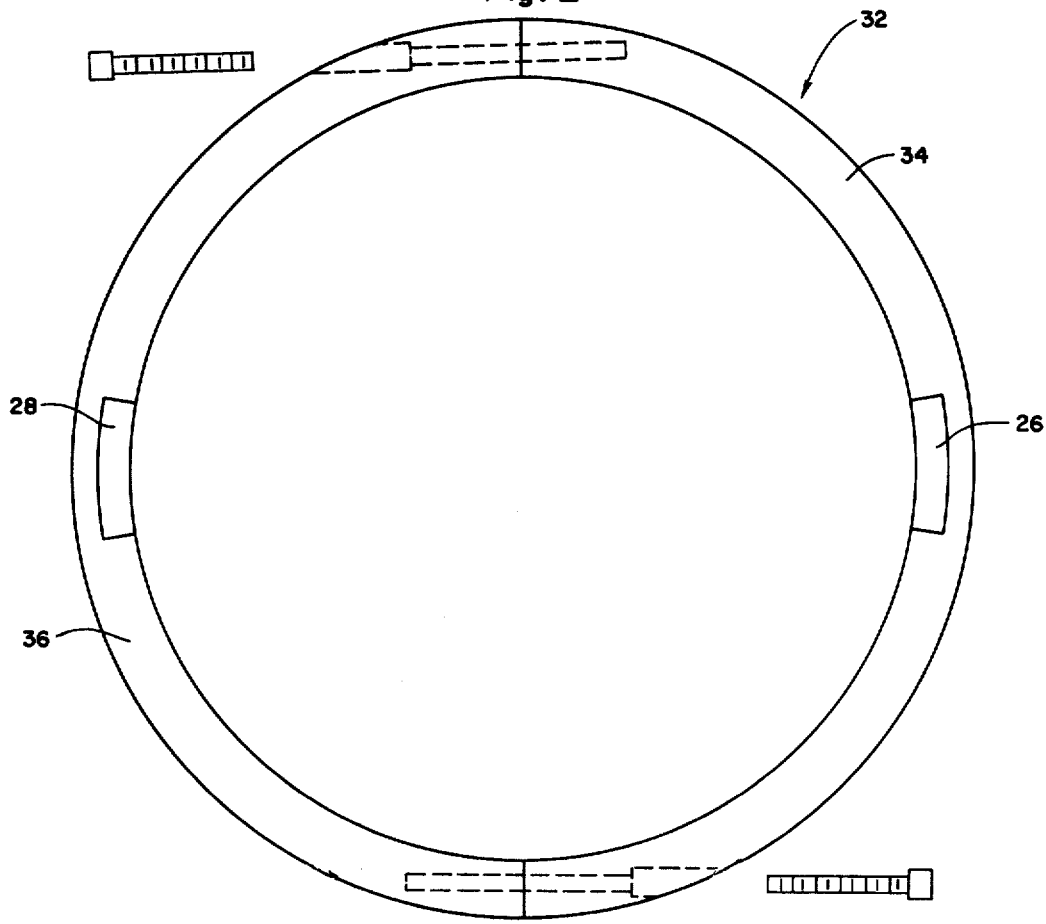
FIG. 3 is a plan view of the control ring.

The external coupling ring 32 may be made in two sections 34, 36 as shown in FIG. 3 and the ring may be constructed of any non-magnetic material. The ring may be mounted on a bearing or roller assembly (not shown) to accomodate rotational motion. The two sections 34, 36 may be bolted together for semi permanent installation or may be clamped together for temporary installation. The inserts 26, 28 on the external ring 32 are magnetized and placed so as to be coupled to the internal magnetic inserts 16, 18.

The wire grid polarizer's operation is complex. Basically, the wires 20 introduce a loss in the laser cavity in the direction parallel to the wires. The result is that the parallel component of the transverse electric vector Z is depleted and the resulting output is polarized perpendicular to the wires. With a proper choice of components, polarization may be obtained in over 97 percent of the frequency spectrum. The introduction of the wire grid polarizer 12 introduces a power loss of approximately 10 percent. Care must be taken to ensure that the mounting ring 14 of the wire grid has sufficient inner diameter to prevent further losses caused by aperturing.

The actual rotating of the polarizer is accomplished by the manual movement of the outer ring through magnetic coupling to the inner ring. The magnetic sections of each ring are magnetically linked to each other and provide the motion through the wall of the laser tube 30. The outer ring mount may be modified for a belt or pulley drive and may be attached to a motor or other means of continous rotation if desired.

From the foregoing it may be seen that a polarization device for a gas laser has been provided which eliminates alignment problems and minimizes losses resulted from polarizing the laser beam. This technique also provides a constant output level as compared to any external techniques.

What is claimed is:

1. In a laser cavity including a cylindrical non magnetic tube surrounding a portion of the internal optical axis and polarization means in said cavity inducing a direction of polarization in the laser energy thereby providing polarized output, the improvement comprising:

a cylindrical non magnetic mounting ring rotatable within said tube and having discrete magnetic areas on opposing outer peripheral portions thereof; and
   a control ring of non magnetic material dimensionally similar to said mounting ring surrounding said tube and comprising diametrically opposed areas of magnetized material;
   said polarization means being mounted in said mounting ring; and
   said control ring and said mounting ring being so arranged that said areas of magnetic material are opposite said magnetic areas so rotation of said control ring will cause rotation of said mounting ring by magnetic coupling action to adjust the direction of polarization in the laser energy.

* * * * *